United States Patent
Hiltunen et al.

(10) Patent No.: US 8,130,312 B2
(45) Date of Patent: Mar. 6, 2012

(54) REFLOWABLE CAMERA MODULE WITH INTEGRATED FLASH

(75) Inventors: Jari Hiltunen, Mouhijarvi (FI); Jess Jan Young Lee, Menlo Park, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 543 days.

(21) Appl. No.: 12/337,470

(22) Filed: Dec. 17, 2008
(Under 37 CFR 1.47)

(65) Prior Publication Data
US 2009/0153729 A1 Jun. 18, 2009

Related U.S. Application Data

(60) Provisional application No. 61/014,378, filed on Dec. 17, 2007.

(51) Int. Cl.
*H04N 5/222* (2006.01)
*H04N 5/225* (2006.01)
*H01L 31/0232* (2006.01)
*H01L 21/302* (2006.01)

(52) U.S. Cl. ......... 348/371; 348/376; 257/432; 438/737
(58) Field of Classification Search .................. 396/376; 348/371, 376, E5.022, E5.038
See application file for complete search history.

(56) References Cited

U.S. PATENT DOCUMENTS

| | | | |
|---|---|---|---|
| 5,179,469 A * | 1/1993 | Hall et al. ..................... | 359/360 |
| 5,714,752 A | 2/1998 | Ueno et al. | |
| 6,445,884 B1 | 9/2002 | Yahav | |
| 7,224,384 B1 | 5/2007 | Iddan et al. | |
| 7,436,448 B2 * | 10/2008 | Chen .............................. | 348/360 |
| 7,651,878 B2 * | 1/2010 | Ryu ................................ | 438/25 |
| 7,679,671 B2 * | 3/2010 | Tanaka et al. ................ | 348/370 |
| 2003/0080188 A1 * | 5/2003 | Carlson et al. ................ | 235/454 |
| 2006/0171698 A1 * | 8/2006 | Ryu et al. ..................... | 396/114 |

FOREIGN PATENT DOCUMENTS

| EP | 1696495 A1 | 8/2006 |
|---|---|---|
| KR | 1020060045162 A | 5/2006 |

OTHER PUBLICATIONS

International Search Report and Written Opinion issued in related PCT/US2008/086967 dated Jul. 22, 2009, 12 pages.
Company Information for Luxeon, Lumileds Lighting U.S. LLC, 2005, 1 page.
"Luxeon Flash for Cell Phone Camera, PDA and DSC Applications," Reference Design DR01 (Feb. 2005) pp. 1-5.

* cited by examiner

*Primary Examiner* — Tuan Ho
*Assistant Examiner* — Shahbaz Nazrul
(74) *Attorney, Agent, or Firm* — Lathrop & Gage LLP

(57) ABSTRACT

A reflowable camera module is implemented using a Chip Scale Package (CSP). An image sensor is formed on one portion of the carrier. A light emitting diode (LED) is formed on another portion of the carrier. The LED serves as an integrated camera flash. Additional optical isolation is provided within the camera module to prevent stray light generated by the LED from degrading image quality.

21 Claims, 4 Drawing Sheets

REFLOWABLE CAMERA MODULE WITH INTEGRATED FLASH

CROSS REFERENCE TO RELATED APPLICATION

This application claims the benefit of U.S. Provisional Application No. 61/014,378, filed Dec. 17, 2007 which application is hereby incorporated by reference in its entirety.

FIELD OF THE INVENTION

The present invention is generally related to camera modules in which an image sensor is mounted in a reflowable package. More particularly, the present invention is directed to providing a flash in a reflowable camera module.

BACKGROUND OF THE INVENTION

Many mobile phones include a built-in digital camera, such as a digital still camera (DSC). Mobile phones with a built-in camera are also commonly known as camera-phones. Some camera-phones also include an electronic flash unit to permit a user of a camera-phone to take high quality pictures in a variety of lighting conditions.

There is increasing interest in using white-light Light Emitting Diodes (LEDs) as flash units in camera-phones. This is due, in part, to the fact that white-light LEDs are significantly increasing their efficiency. Another factor that is of increasing interest in white-light LEDs is that miniaturization of xenon tube flash units has not been as successful as mobile phone makers require for some applications. For example, the Philips Lumiled Lighting Company publishes a reference design DR01 for using white-light LEDs in DSC and camera-phone flash applications. The Lumileds Lighting reference design DR01 is for a flash module based on a Luxeon® LED technology (a "Luxeon Flash"). The Luxeon Flash module is a unit that has an LED chip mounted to a submount. The submount, in turn, is directly mounted to a printed circuit board.

A disadvantage of using a white-light LED as a flash in a compact consumer device, such as a camera-phone, is that it increases costs and requires some extra space that must be taken into account in designing a phone. A conventional white-light LED flash unit, such as a Luxeon Flash, is an extra unit that increases the number of manufacturing and packaging steps required to fabricate a consumer camera device such as a camera-phone.

Therefore in light of the above-described problem, the apparatus, system, and method of the present invention was developed.

SUMMARY OF THE INVENTION

A reflowable camera module is disclosed that includes an image sensor and an integrated flash mounted to a common carrier and packaged together with a lens unit. In one implementation the flash is a white-light Light Emitting Diode (LED). Optical isolation is provided within the camera module to prevent stray light from the flash from degrading image quality.

In one implementation, the reflowable camera module is formed using a Chip Scale Package (CSP) process. The image sensor and the LED are built together into a common Chip Scale Package (CSP) package having separate electrical connections for the image sensor and the LED. A common glass capping layer covers the image sensor and the LED. Optical isolation is formed within the glass capping layer to prevent stray light generated by the LED from degrading image quality. In one implementation, optical isolation is provided using an optical barrier formed within the glass capping layer. In other implementation, optical isolation is provided using a light guide formed within the glass capping layer.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
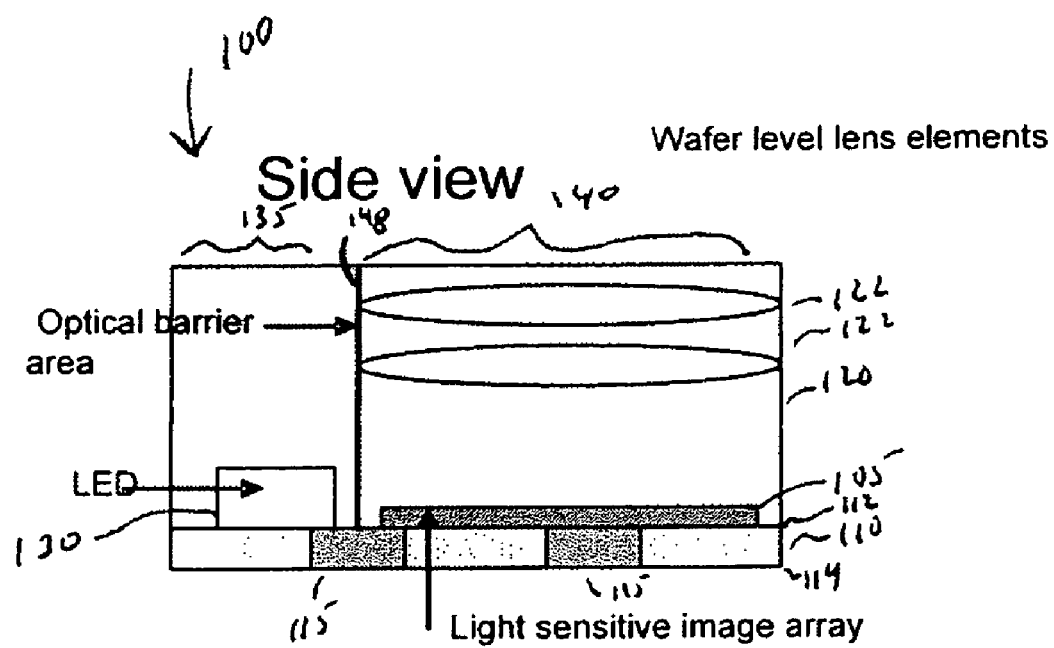
FIG. 1 is a side view of a reflowable camera module having an integrated flash in accordance with one embodiment of the present invention.

FIG. 1 illustrates a side view of a camera module 100 having an image sensor 105 mounted to a top surface 112 of Chip Scale Package (CSP) carrier 110. A Chip Scale Package (CSP) is a type of integrated circuit carrier. Current generation CSP packages commonly have an area no greater than about 1.2 times the size of the die and/or a ball pitch that is no greater than one millimeter.

The image sensor 105 is a semiconductor die upon which is formed an array of light sensitive pixels (e.g., a light sensitive image array). As one example, the image sensor 105 may be implemented as a Complementary Metal Oxide Semiconductor (CMOS) image sensor to capture digital images.

The CSP carrier 110 forms the base of a reflowable camera module 100; i.e. a camera module having a bottom surface 114 with solder regions that can be reflowed onto a printed circuit board (not shown) using a solder reflow technique. As one example, the CSP carrier 110 may have contact regions 115 formed within the CSP carrier 110 to permit electrical connections to be made between a bottom surface 114 to a motherboard (not shown). In one implementation, a Ball Grid Array (BGA) of solder balls is used to form solder joints with a printed circuit motherboard.

In accordance with the present invention a flash is integrated into the camera module 100. The flash is preferably implemented as a light emitting diode (LED) 130 integrated into the camera module 100 to serve as an LED flash. The LED 130 is mounted to the CSP carrier 110 and separate electrical connections (not shown) are provided in the CSP carrier 110 to provide power and synchronization signals for the LED 130. In one embodiment LED 130 is implemented using a single white-light LED. However, it will be understood that other arrangements, such as multiple LED's, are contemplated. The LED 130 may include its own lens elements (not shown). Alternately, an additional lens to focus light emitted from the LED out of a camera could be included in glass capping layer 120 and/or mounted on top of the camera module 100.

The camera module 100 is preferably manufactured using a wafer level CSP manufacturing process in which an entire wafer is capped with an optical (glass) capping layer 120 before the wafer is sawed into individual units. Wafer-level lens elements 122 are formed into glass capping layer 120 of the camera module to focus light onto pixels of the image sensor 105. The general principles of designing a wafer-level Chip Scale Package (CSP) camera module are described in U.S. Pat. Pub. No. 20070052827 by Hiltunen "Coated Wafer Level Camera Modules and Associated Methods," the contents of which is hereby incorporated by reference. However, in accordance with the present invention, a variation from a standard wafer level CSP camera module process is that both LEDs 130 and image sensors 105 are preferably mounted to a wafer-level CSP carrier 110 before attaching the glass capping layer 120.

The camera module 100 is, for optical purposes, divided into a flash portion 135 and an image sensing portion 140. The flash portion 135 of camera module 100 is optically isolated from the image sensing portion 140. That is, stray light generated by the LED 130 in a flash mode is prevented from entering the image sensor 105 at an optical power level which would degrade image quality. Conventional LEDs tend to emit light with a significant angular divergence. Additionally, when flash pictures are taken the emitted optical power level at the LED 130 may be significantly higher than the received power level at the image sensor 105. Consequently, optical isolation of the flash portion 135 and the image sensing portion 140 is required to prevent stray light generated by LED 130 from overwhelming the image sensor 105.

In one implementation, optical isolation is provided by including an optical barrier 148 that divides the flash portion 135 and image sensing portion 140 into optically separate sections. As one example, the optical barrier 148 may be implemented as a physical layer that blocks the transmission of light using absorption or reflection. For example, in one embodiment of a wafer level CSP process the optical barrier 148 is created by first forming a cavity in glass capping layer 120. The cavity, in turn, may have a coating deposited in it to serve as an optical barrier 148. In particular, in one embodiment the glass capping layer 120 is sawn through, with the saw cut forming a cavity into which a metal layer is deposited. Depending on the metal that is used, the metal will be optically reflective or absorbing at the emission wavelengths generated by LED 130. Forming a metal layer on a saw cut has the advantage that the process steps are compatible with other process steps used in wafer level CSP camera modules. However, it will be understood that other process steps may be used to form a cavity within the glass capping layer 120 instead of using a saw cut. Additionally, other types of materials could be deposited within a saw cut to serve as an optical barrier, such as a multi-layer coating having layers with different material compositions.

In an alternate implementation, optical isolation is provided by using differences in refractive indices to guide light out of the flash portion 135 and away from the image sensing portion 140. In this embodiment, optical barrier 148 comprises one or more light guides, such as light pipes. Light guides, such as light pipes, utilize internal reflection to guide light. As is well known in the field of optics, internal reflection occurs when light travels from an optical medium with a higher refractive index to one with a lower refractive index such as when light passes from glass to air. In particular, there is a critical angle of incidence above which total internal reflection occurs. Light pipes utilize multiple internal reflections to guide light. One or more light pipes may be fabricated in the glass capping layer 120 in the flash portion 135 by forming one or more or holes (cavities) in glass capping layer 120 to prevent stray light generated by the LED 130 from entering the image sensing portion 140 of the camera module. While true light piping is contemplated, it will be understood that the objective is to prevent stray light generated by the LED 130 from entering the image sensor portion 140 of the camera module 100 at a power level that would degrade image quality. Consequently, the optical characteristics of the light pipes may deviate somewhat from those of ideal light pipes. In particular, the optical characteristics of the light pipes may deviate somewhat from 100% optical guiding (within the light pipe) as long as the light pipes in conjunction with other components provide sufficient optical isolation. It would therefore be understood by one of ordinary skill in the art that optical isolation may be provided using a combination of light guiding and a physical barrier layer. For example, imperfect light guiding may be tolerated if there is sufficient additional optical absorption to reduce stray light levels to acceptable levels. This would relax the optical requirements of the light pipes, as total internal reflection would not be required.

Figure 2:
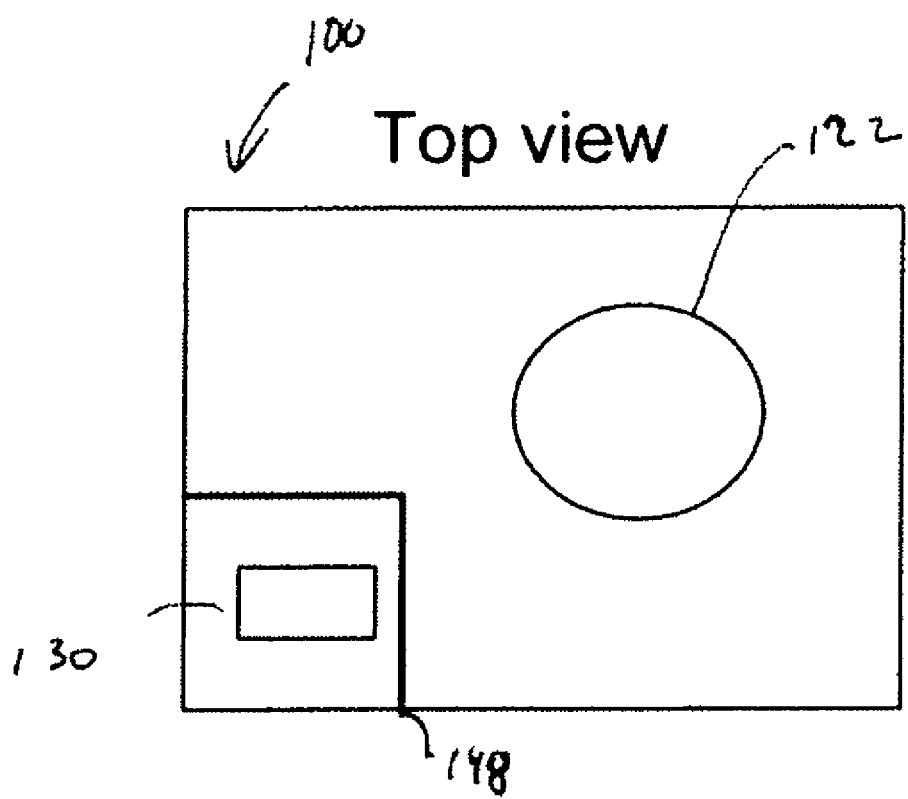
FIG. 2 is a top view of the camera module in accordance with one embodiment of the present invention.

FIG. 2 illustrates a top view of the camera module. As illustrated in FIG. 2, the optical barrier 148 preferably extends around the entire flash portion 135 of the camera module 100.

Figure 3:
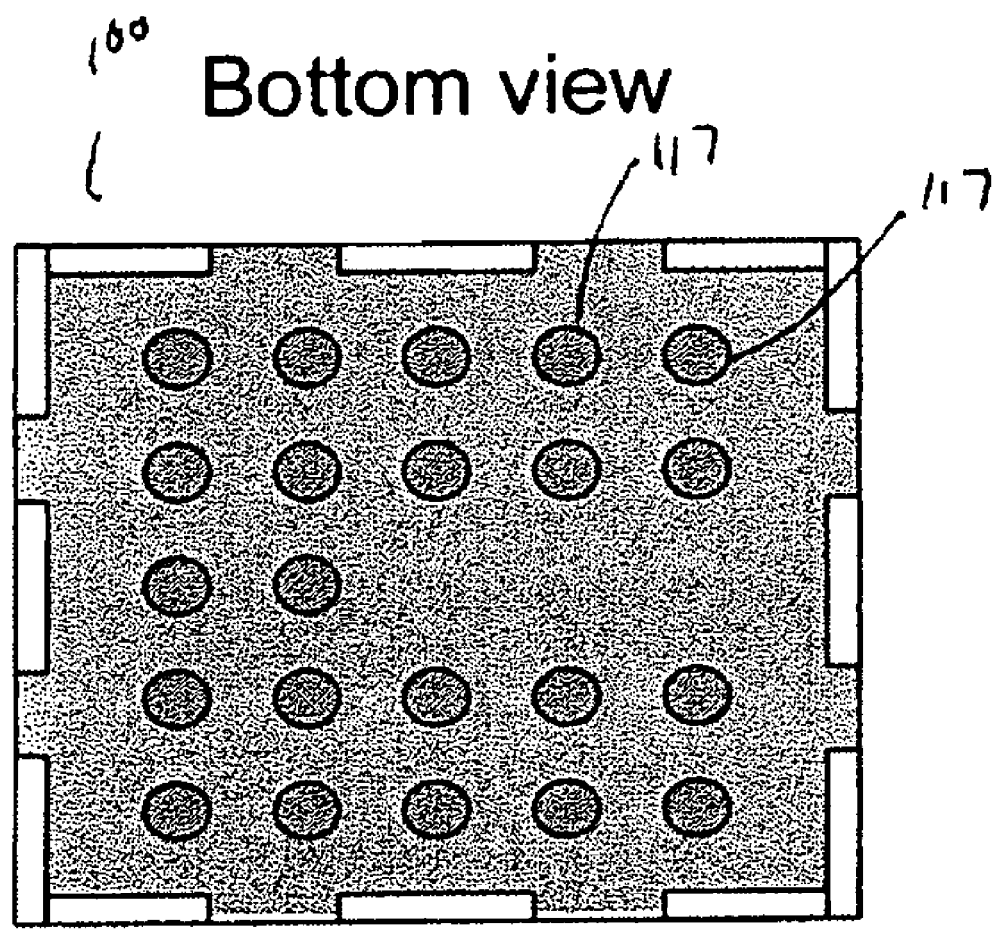
FIG. 3 is a bottom view of the camera module in accordance with one embodiment of the present invention.

FIG. 3 illustrates a bottom view of the camera module 100. In one implementation solder ball contact pads 117 are formed on the bottom side of the carrier to permit electrical connections to be made to both the image sensor 105 and the LED 130. For example, some of the solder ball contacts may be assigned for synchronization and power to the LED 130. The solder ball contacts may, for example, be arranged for a BGA reflow process to mount the camera module 100 to a motherboard (not shown).

One benefit of the present invention is improved manufacturability in high volume consumer device applications; such as camera phones. A reflowable camera module with integrated flash permits both an image sensor and a flash to be electrically connected to a motherboard using a common solder reflow process.

Figure 4:
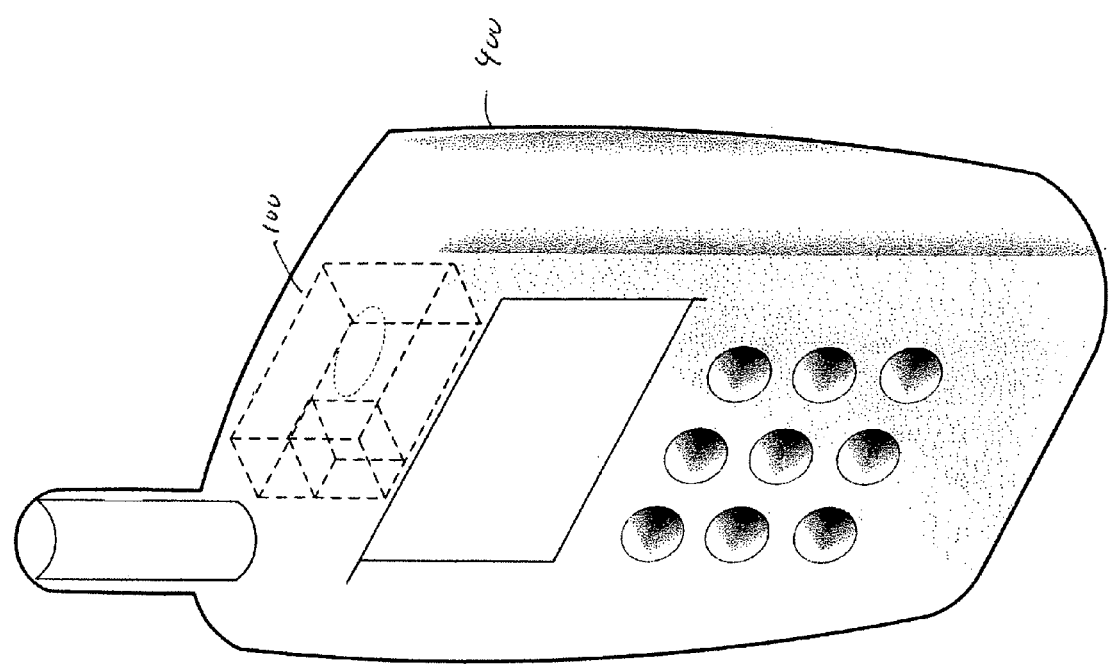
FIG. 4 illustrates an exemplary application of the camera module in a mobile phone in accordance with one embodiment of the present invention.

FIG. 4 illustrates an exemplary application of the camera module 100 in a camera-phone 400. The camera module 100 is illustrated by dashed lines and may be attached to a motherboard (not shown) of the camera-phone 400 using a solder reflow process as previously described. From a consumer perspective, the end user of the camera-phone 400 has the benefit of a camera-phone having a camera and a flash to improve image quality whenever there are poor ambient lighting conditions. However, the camera module 100 of the present invention with an integrated LED flash reduces the number of separate units that must be assembled, reducing manufacturing costs. Additionally, since the LED shares the same CSP carrier, there are potential reductions in total volume of components, which is also beneficial in a compact consumer device. Furthermore, the camera module 100 is compatible with a solder reflow process to mount the image sensor 105 and LED 130 to a motherboard, reducing the number of process steps.

While examples have been described in which the flash is an LED, it will be understood that the present invention may be utilized with other energy efficient miniature light sources that can be packaged on a CSP carrier with the image sensor. For example, there is ongoing industrial research in other types of photonic devices (e.g., semiconductor lasers) which may eventually result in commercial alternatives to white-light LEDs.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

The invention claimed is:

1. A camera module, comprising:
   an image sensor in a first portion of the camera module to capture digital images;
   a flash in a second portion of the camera module;
   the image sensor and the flash mounted to a common carrier with the camera module optically isolating the first portion of the camera module from the second portion of the camera module;
   a glass capping layer covering the flash and the image sensor; and
   an optical barrier formed within the glass capping layer to provide optical isolation of the flash from the image sensor.

2. The camera module of claim 1, wherein the camera module is a reflowable camera module and the common carrier is a Chip Scale Package (CSP) carrier.

3. The camera module of claim 1, wherein the flash includes a light emitting diode (LED).

4. The camera module of claim 3, wherein the carrier includes separate electrical connections for the image sensor and the LED.

5. The camera module of claim 1, wherein at least one optical light pipe is formed in the glass capping layer to optically isolate the LED from the image sensor.

6. The camera module of claim 1, wherein the glass capping layer includes at least one lens element for the image sensor.

7. A camera module, comprising:
   a Chip Scale Package (CSP) carrier;
   an image sensor mounted to a first portion of the CSP carrier;
   a light emitting diode (LED) mounted to a second portion of the CSP carrier to serve as a camera flash;
   a glass capping layer covering the image sensor and the LED; and
   an optical barrier within the glass capping layer to prevent stray light generated by the LED in a flash mode from degrading image quality.

8. The camera module of claim 7, wherein the glass capping layer is formed using a wafer level CSP process with the glass capping layer including at least one lens element for the image sensor.

9. The camera module of claim 7, wherein the optical barrier comprises an optical barrier formed in the glass capping layer.

10. The camera module of claim 9, wherein the optical barrier comprises a metal deposited in a cavity formed within the glass capping layer.

11. The camera module of claim 9, wherein the optical barrier comprises at least one region in which internal reflection is used to prevent light generated by the LED from entering the image sensor.

12. The camera module of claim 9, wherein the optical barrier comprises at least one light pipe formed in the glass capping layer.

13. The camera module of claim 7, wherein the carrier includes separate electrical connections for the LED and the image sensor.

14. A camera module, comprising:
    an image sensor;
    a light emitting diode (LED) to serve as a camera flash;
    the image sensor and the LED mounted to a common Chip Scale Package (CSP) carrier having separate electrical connections for the image sensor and the LED;
    a common glass capping layer covering the image sensor and the LED; and
    optical isolation within the glass capping layer to prevent stray light generated by the LED from degrading image quality;
    the CSP carrier serving as the base of a reflowable camera module.

15. The camera module of claim 14, wherein the optical isolation comprises at least one light pipe formed within the glass capping layer.

16. The camera module of claim 14, wherein the optical isolation comprises an optical barrier region formed within the glass capping layer.

17. The camera module of claim 14, wherein the camera module is disposed within a camera-phone.

18. A method of forming a camera module comprising:
    mounting an image sensor to a first portion of a Chip Scale Package (CSP) carrier;
    mounting a light Emitting Diode (LED) to a second portion of the Chip Scale Package carrier;
    forming a glass capping layer to cover the image sensor and LED; and
    forming optical isolation within the glass capping layer to optically isolate the first portion from the second portion.

19. The method of claim 18, wherein the camera module is formed using a wafer level process, the method comprising forming image sensors and LEDs at a wafer level and sawing the wafer into individual camera modules.

20. A method of manufacturing a consumer device having an image sensor and a flash, comprising:
    providing a reflowable camera module including an image sensor and a light emitting diode flash mounted to a common carrier, a glass capping layer covering the flash and the image sensor, and an optical barrier fowled within the glass capping layer to provide optical isolation of the flash from the image sensor; and
    using a solder reflow process to mount the reflowable camera module to a motherboard.

21. The method of claim 20, wherein the consumer device is a camera-phone.

* * * * *

UNITED STATES PATENT AND TRADEMARK OFFICE
CERTIFICATE OF CORRECTION

PATENT NO.         : 8,130,312 B2                                               Page 1 of 1
APPLICATION NO.    : 12/337470
DATED              : March 6, 2012
INVENTOR(S)        : Jari Hiltunen et al.

It is certified that error appears in the above-identified patent and that said Letters Patent is hereby corrected as shown below:

Column 6, line 52, "fowled" should read --formed--;

Signed and Sealed this
Nineteenth Day of June, 2012

David J. Kappos
*Director of the United States Patent and Trademark Office*